(12) United States Patent
Weibel et al.

(10) Patent No.: US 6,823,899 B2
(45) Date of Patent: Nov. 30, 2004

(54) INSULATED PIPE ARRANGEMENT AND METHOD FOR ITS PRODUCTION

(75) Inventors: Jürg P. Weibel, Hagendorn (CH); Valentin Galliker, Balsthal (CH); Urs Flück, Laupersdorf (CH)

(73) Assignee: Armacell Enterprise, GmbH, Munster (DE)

( * ) Notice: Subject to any disclaimer, the term of this patent is extended or adjusted under 35 U.S.C. 154(b) by 98 days.

(21) Appl. No.: 10/392,628

(22) Filed: Mar. 20, 2003

(65) Prior Publication Data

US 2003/0209279 A1 Nov. 13, 2003

(30) Foreign Application Priority Data

Mar. 25, 2002 (EP) .......................................... 02006822

(51) Int. Cl.⁷ ................................................. F16L 9/14
(52) U.S. Cl. ..................... 138/149; 138/115; 138/111; 138/116; 138/178; 156/296; 156/152
(58) Field of Search ................................ 138/149, 111, 138/115, 116, 117, 177, 178, 156; 156/244.11, 244.22, 244.24, 296, 344, 152; 174/47

(56) References Cited

U.S. PATENT DOCUMENTS

| | | | | |
|---|---|---|---|---|
| 554,322 A | * | 2/1896 | Thorpe ........................ | 138/115 |
| 2,122,335 A | * | 6/1938 | Berman et al. ........ | 156/244.14 |
| 2,136,230 A | * | 11/1938 | Berman et al. .............. | 138/111 |
| 2,139,888 A | * | 12/1938 | Fausek et al. ............... | 138/115 |
| 2,621,075 A | * | 12/1952 | Sedar .......................... | 239/450 |
| 3,694,563 A | * | 9/1972 | Monds et al. ................. | 174/97 |
| 4,148,341 A | * | 4/1979 | Lundbohm .................. | 138/105 |
| 4,399,319 A | * | 8/1983 | Zinn ........................... | 174/47 |
| 5,211,784 A | * | 5/1993 | Haibach et al. .............. | 156/71 |
| 5,400,602 A | * | 3/1995 | Chang et al. ................ | 62/50.7 |
| 6,087,583 A | * | 7/2000 | Runge .......................... | 174/47 |

FOREIGN PATENT DOCUMENTS

| | | | |
|---|---|---|---|
| DE | 25 48 024 | 10/1975 | ............. F24D/3/02 |
| DE | 299 23 057 U1 | 12/1999 | ............. F24J/2/04 |
| EP | 0 428 368 A1 | 5/1991 | .......... F16L/11/127 |
| GB | 2 156 033 A | 10/1985 | ............ F16L/11/00 |

* cited by examiner

Primary Examiner—Patrick Brinson
(74) Attorney, Agent, or Firm—Womble Carlyle Sandridge & Rice, PLLC

(57) ABSTRACT

The insulated pipe arrangement comprises at least two pipe bodies, each of which has a flexible inner fluid-guiding pipe, which is enclosed by an insulating layer made of elastomeric or thermoplastic foam, a protective film made of a thermoplastic, elastomer, or duromer of high-density being arranged around the insulating layer. The pipe bodies are bonded on opposing peripheral parts of their protective film by a layer of an adhesive which allows detachment of the adhesive bond without the protective film being damaged and which produces a renewed adhesive bond after detachment of the adhesive bond when the peripheral parts of the previous adhesive bond are brought into contact again.

6 Claims, 2 Drawing Sheets

INSULATED PIPE ARRANGEMENT AND METHOD FOR ITS PRODUCTION

RELATED APPLICATION

This application claims priority under 35 U.S.C. §119(b) to European application serial no. 02 006 822.7, filed on Mar. 25, 2002.

TECHNICAL FIELD

The present invention relates to an insulated pipe arrangement, comprising at least two pipe bodies, each of which has an inner fluid-guiding pipe which is enclosed by an insulating layer made of elastomeric or thermoplastic foam, a protective film made of a thermoplastic, elastomer, or duromer of high density being arranged around the insulating layer, as well as a method for producing such an insulated pipe arrangement.

BACKGROUND

Welding two pipe bodies to one another, each of which comprises an inner fluid-guiding pipe made of metal or plastic which is enclosed on the outside by an insulating plastic, which in turn has an outer casing made of polyethylene, along peripheral parts opposite one another in the axial direction through the effect of heat, is already known. If such a pipe arrangement formed by two pipes has to be connected to connections which are at a distance to one another that is greater than the spacing of the metal pipes of the welded pipe bodies, the weld seam is detached through the corresponding effect of force on the two pipe bodies. In the event of such tearing of the weld seam, the polyethylene film forming the outer layer is damaged, so that it no longer offers a protective effect at the peripheral parts of the previous weld. When the weld seam is opened too far and therefore must be closed again, this requires renewed welding or gluing, which is very costly.

A conduit system for piping facility components in the field of heating technology, in which two flexible metal pipes are embedded at a distance to one another in a shared foam body having an oval or elliptical cross-section, which is enclosed on the outside by a protective film, is known from German Utility Model 299 23 057 U1. An intended breaking point is provided between the two flexible metal pipes in the insulating body, which allows breaking apart in the axial direction so that the two pipes may be connected to connections whose distance is greater than that of the pipes in the insulating body, which forms one piece. Reconnection of the individual pipe bodies separated along the intended breakpoint is only possible by applying adhesive.

SUMMARY

The object upon which the present invention is based is to design the pipe arrangement of the type initially cited in such a way that the at least two pipe bodies may be separated from one another and reconnected to one another at the same point without problems.

This object is achieved, on the basis of the insulated pipe arrangement of the type initially cited, in that the pipe bodies are connected to one another on opposing peripheral parts of their protective film by a layer of adhesive which allows detachment of the adhesive bond without the protective film being damaged, and which produces a renewed adhesive bond after detachment of the adhesive bond when the peripheral parts of the previous adhesive bond are brought into contact again.

Such an adhesive is expediently a pressure-sensitive adhesive, preferably based on acrylic, or an adhesive in the form of a synthetic thermoplastic rubber. The protective film is expediently made of polyethylene, polyvinyl chloride, rubber, or other thermoplastics. The pipe bodies may have the same diameter or different diameters.

The adhesive bond of the two pipe bodies remains in existence even if the insulated pipe arrangement is wound onto a drum or laid in an annular shape, for example.

The insulated pipe arrangement according to the present invention allows separation of the two pipe bodies from one another at one end of the pipe arrangement by pulling the pipe bodies away from one another. The bond is detached in the region of the layer of adhesive, without the protective film at the peripheral parts of the adhesive bond being damaged in this way. The composition of the adhesive allows reproduction of the adhesive bond merely by pressing the peripheral parts, which have the layer of adhesive forming the previous adhesive bond, against one another.

Such an insulated pipe arrangement is produced according to a method in which an insulating layer made of an elastomeric or thermoplastic foam, in which an opening is or will be formed in the axial direction, is laid around each of at least two continuously transported flexible and/or easily bendable inner pipes for fluid guiding. The axial opening is closed into an insulating hose by interposing a hot-melt adhesive. A protective film made of a thermoplastic, elastomer, or duromer of high density, in the range of 200 to 2000 $kg/m^3$, for example, is extruded onto the insulating hose to form a pipe body. Subsequently, the pipe bodies are moved toward one another, with a layer of an adhesive being interposed between opposing peripheral parts, and bonded to one another using adhesive along the peripheral parts of the protective parts. The adhesive bond is detached, without damaging the protective film, by pulling the pipe bodies away from one another, and is reproduced by pressing the peripheral parts which formed the previous adhesive bond against one another again.

Thin metal pipes, such as copper pipes, pipes made of plastic, or composite pipes, for example those made of aluminum and plastic, are used as the inner flexible or easily bendable pipes. The foam may be produced in the form of a slab which is laid around the metal pipe and bonded along the axial opening, or by a hose which is cut before being laid around the metal pipe and is bonded back into one piece by gluing the cut surfaces after being laid around the metal pipe.

DESCRIPTION OF THE DRAWINGS

An exemplary embodiment of the present invention is described in more detail on the basis of the drawings.

DETAILED DESCRIPTION

Figure 1:
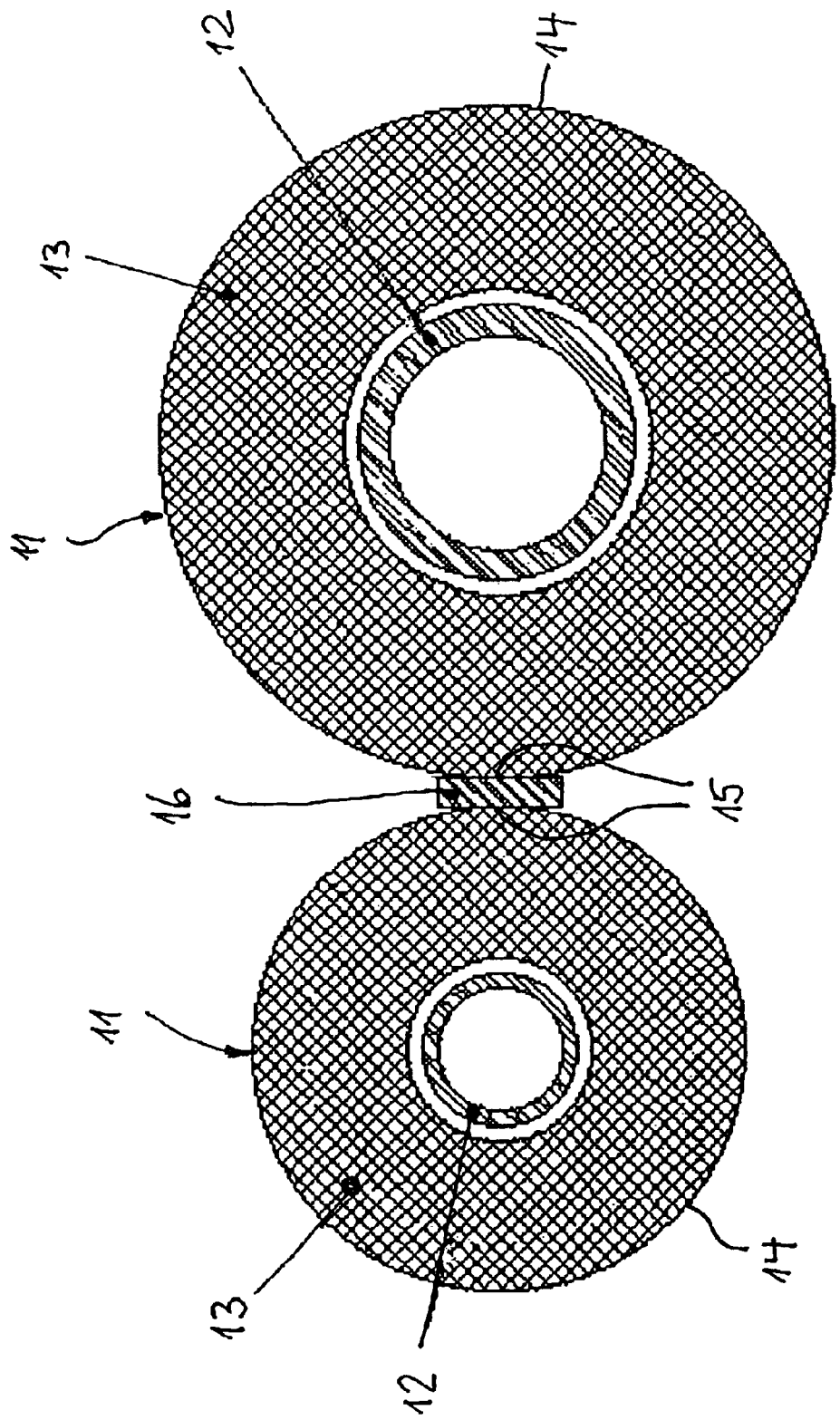
FIG. 1 shows an embodiment of an insulated pipe arrangement in cross-section.

The insulated pipe arrangement shown in FIG. 1 comprises two pipe bodies 11. Each pipe body 11 has a central flexible metal pipe 12 for a fluid guide, for example, a copper pipe for a hot or cold fluid to flow through. An insulating layer 13 made of an elastomeric or thermoplastic foam, which is enclosed on the outside by a protective film 14, for example, a polyethylene film, is arranged around the metal pipe 12.

The two pipe bodies 11 are bonded to one another at opposing peripheral parts 15 of their protective films 14 by a layer 16 made of an adhesive, which is a pressure-sensitive adhesive based on acrylic or based on a thermoplastic rubber and which allows the adhesive bond of the peripheral parts 15 produced by it to be detached by pulling the pipe bodies 11 apart, without damaging the protective film 14, and which allows the previous adhesive bond to be reproduced when the peripheral parts 15 are brought back into contact, and whose adhesive bond remains in existence if the pipe arrangement is wound around a drum or laid in annular loops.

Figure 2:
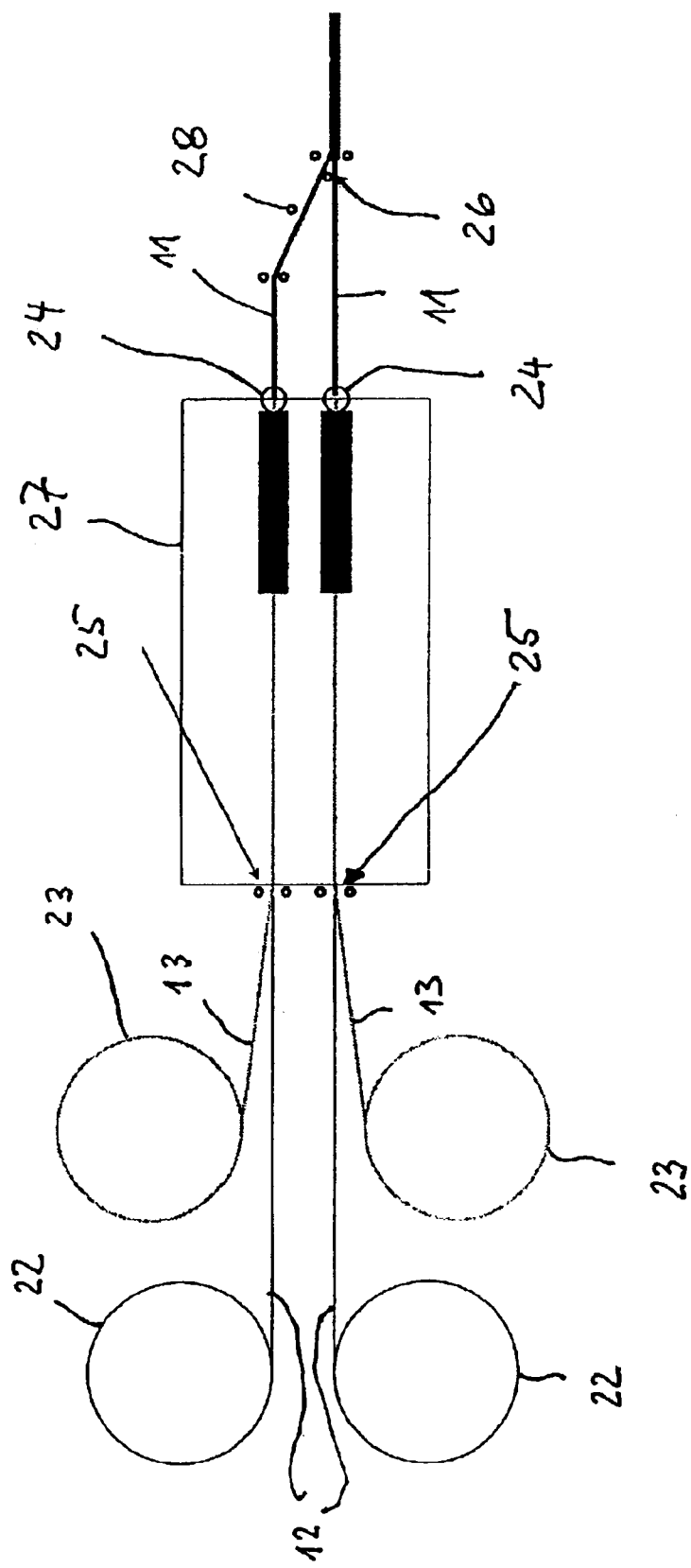
FIG. 2 schematically shows a device for producing the insulated pipe arrangement from FIG. 1.

The device shown in FIG. 2, in which a strand 12 of a metal pipe is drawn off of each of two winding drums 22 and continuously supplied to a position 25, at which an insulating layer 13 in the form of a hose, drawn off of a drum 23, is axially cut in the lengthwise direction, laid around the metal pipe 12, and glued again after applying a hot-melt adhesive to the cut surfaces, is suitable for producing such an insulated pipe arrangement. The adhesive is fixed in a curing device 27, after which a protective film 14 made of polyethylene is extruded and/or co-extruded with the aid of extruders 24 onto the insulating layer 13 applied to the metal pipe 12. Subsequently, the pipe bodies 11 made in this way are guided toward one another with the aid of guide elements 28, a pressure-sensitive adhesive based on acrylic (Fastbond™ 49, 3M Switzerland AG, CH-8803 Rüschlikon) or based on a thermoplastic rubber (ALFA H 3000/0 ALFA Klebstoffe AG, CH-8454 Buchberg) being applied to opposing peripheral parts 15 of the protective film 14 at a position 26 and the pipe bodies 11 being pressed against one another.

The adhesive bond formed in this way allows the pipe bodies 11 of the double pipe arrangement thus formed to be detached by being pulled apart, without the protective film 14 being damaged. If the peripheral parts 15 previously provided with the layer 16 of adhesive are pressed against one another again after the adhesive bond is detached, the adhesive bond is reproduced. However, the adhesive bond is sufficiently strong that it does not detach if the insulated pipe arrangement is wound around a drum or laid in annular loops, for example.

What is claimed is:

1. An insulated pipe arrangement, comprising:
    at least two pipe bodies having a flexible inner fluid-guiding pipe enclosed by an insulating layer formed from an elastomeric or thermoplastic foam, a protective film made of a thermoplastic, elastomer, or duromer of high-density being arranged around the insulating layer, wherein the pipe bodies are bonded on opposing peripheral parts of their protective film by a layer of an adhesive which allows detachment of the adhesive bond without the protective film being damaged and which produces a renewed adhesive bond after detachment of the adhesive bond when the peripheral parts of the previous adhesive bond are brought into contact again.

2. The pipe arrangement according to claim 1, wherein the adhesive is a pressure-sensitive adhesive.

3. The pipe arrangement according to claim 2, wherein the adhesive is a pressure-sensitive adhesive based on acrylic or a synthetic thermoplastic rubber.

4. The pipe arrangement according to claim 1, wherein the protective film is made of polyethylene.

5. The pipe arrangement according to claim 1, wherein the pipe bodies have different or identical external diameters.

6. A method of producing the insulated pipe arrangement according to claim 1, in which an insulating layer made of an elastomeric or thermoplastic foam, in which an opening is formed in the axial direction, is laid around each of at least two continuously transported flexible inner fluid-guiding pipes, the axial opening is closed into an insulating hose by interposing a hot-melt adhesive, and a protective film made of a thermoplastic or elastomer of high density is extruded onto the insulating hose to form a pipe body, after which the pipe bodies, with a layer of an adhesive being interposed between opposing peripheral parts, are moved toward one another and adhesively bonded to one another along the peripheral parts of the protective film,
    wherein the adhesive bond is detached without damaging the protective film by pulling the pipe bodies away from one another and is reproduced by pressing the peripheral parts which formed the previous adhesive bond against one another again.

* * * * *